(12) United States Patent
Matsumoto

(10) Patent No.: US 8,848,265 B2
(45) Date of Patent: Sep. 30, 2014

(54) COLOR CONVERSION DEVICE, COLOR CONVERSION METHOD, RECORDING MEDIUM, AND COLOR SEPARATION DEVICE

(71) Applicant: FUJIFILM Corporation, Tokyo (JP)

(72) Inventor: Tsuyoshi Matsumoto, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/039,508

(22) Filed: Sep. 27, 2013

(65) Prior Publication Data

US 2014/0029060 A1   Jan. 30, 2014

Related U.S. Application Data

(63) Continuation of application No. PCT/JP2012/050049, filed on Jan. 5, 2012.

(30) Foreign Application Priority Data

Mar. 28, 2011   (JP) .................................. 2011-069268

(51) Int. Cl.
*H04N 1/40* (2006.01)
*H04N 1/60* (2006.01)

(52) U.S. Cl.
CPC ......... *H04N 1/40012* (2013.01); *H04N 1/6022* (2013.01)
USPC ........................... 358/518; 358/527; 358/3.24

(58) Field of Classification Search
USPC .............. 358/1.9, 518, 1.13, 1.15–1.16, 1.18, 358/3.06, 2.1, 3.24, 527, 302; 348/97, 121, 348/625
See application file for complete search history.

(56) References Cited

U.S. PATENT DOCUMENTS

| 5,374,954 A | * | 12/1994 | Mowry .......................... 348/121 |
| 6,496,280 B2 | * | 12/2002 | Ishikawa et al. ................ 358/1.9 |
| 7,136,542 B2 | * | 11/2006 | Enomoto ....................... 382/305 |
| 7,432,986 B2 | * | 10/2008 | Winger .......................... 348/625 |
| 2007/0115371 A1 | | 5/2007 | Enomoto et al. | |

FOREIGN PATENT DOCUMENTS

| JP | 2000-78418 A | 3/2000 |
| JP | 2002-374425 A | 12/2002 |
| JP | 2005-94085 A | 4/2005 |

(Continued)

OTHER PUBLICATIONS

International Search Report, mailed Jan. 31, 2012, issued in PCT/JP2012/050049.

(Continued)

*Primary Examiner* — Thomas D Lee
*Assistant Examiner* — Stephen M Brinich
(74) *Attorney, Agent, or Firm* — Birch, Stewart, Kolasch & Birch, LLP

(57) ABSTRACT

Granularity level adjustment areas, in each of which a granularity level of an image is adjusted, are extracted. Each of target values for the granularity levels in the extracted granularity level adjustment areas is set. The granularity level is calculated, and the device color signals in the granularity level adjustment areas are converted, such that the calculated granularity level is closer to the target value than before the device color signals are converted, and such that the new device color signals fall within an isochromatic range in a device-independent color space.

10 Claims, 12 Drawing Sheets

(56) References Cited

FOREIGN PATENT DOCUMENTS

| JP | 2006-264144 A | 10/2006 |
|---|---|---|
| JP | 2006-285959 A | 10/2006 |
| JP | 2007-148537 A | 6/2007 |
| JP | 2008-118191 A | 5/2008 |
| JP | 2009-241609 A | 10/2009 |

OTHER PUBLICATIONS

Written Opinion of the International Searching Authority, mailed Jan. 31, 2012, issued in PCT/JP2012/050049.

* cited by examiner

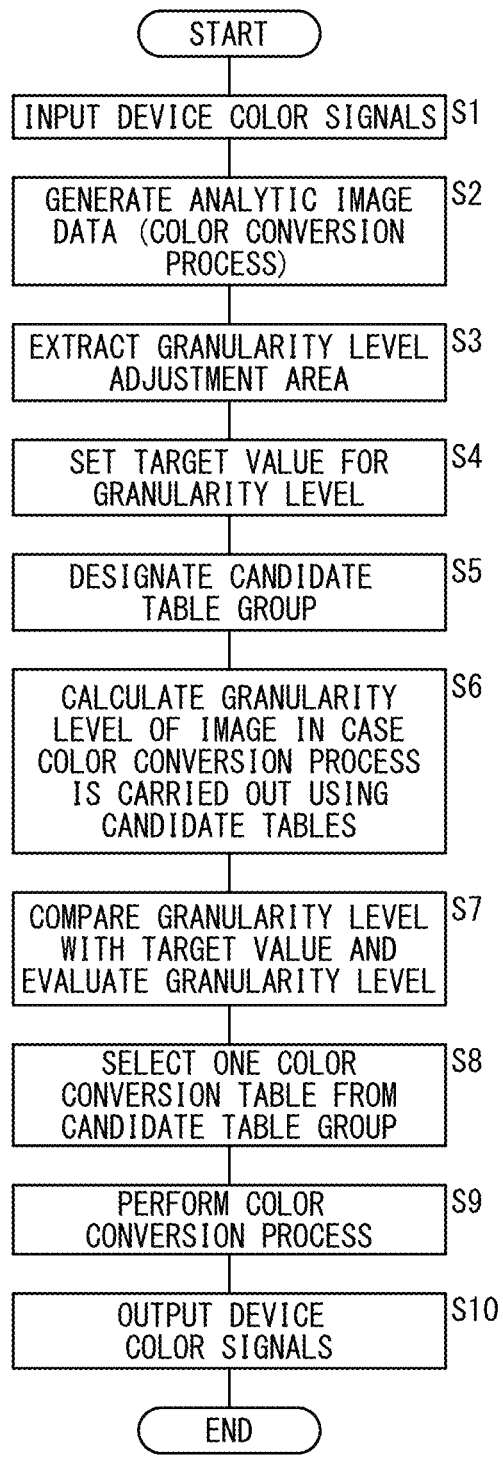

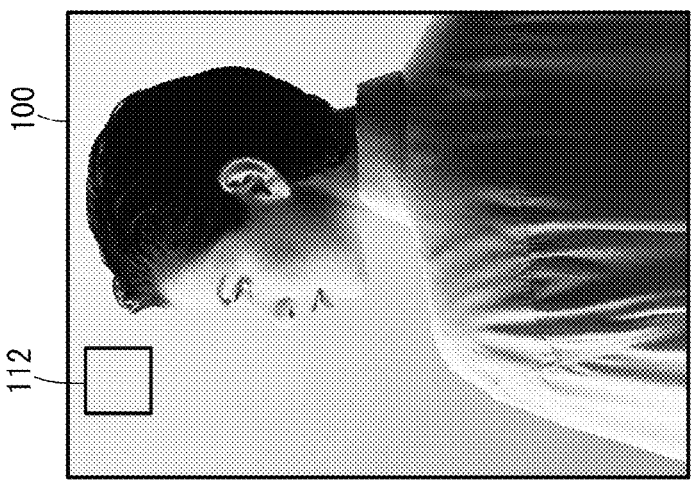
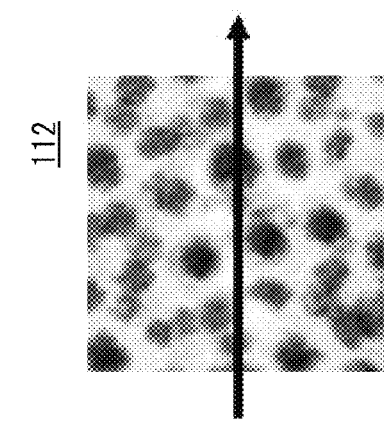
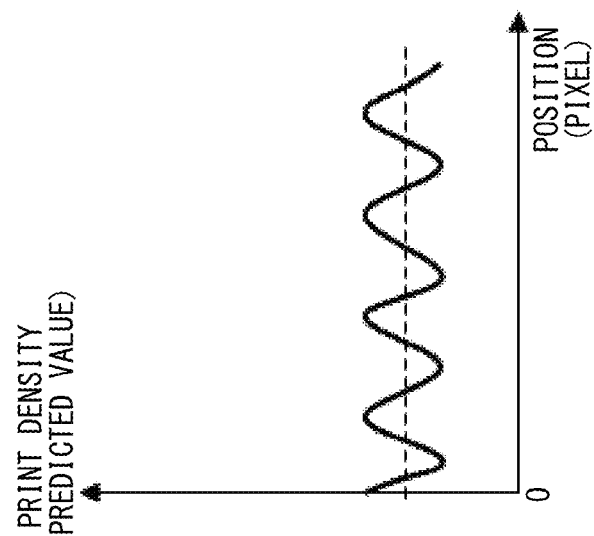

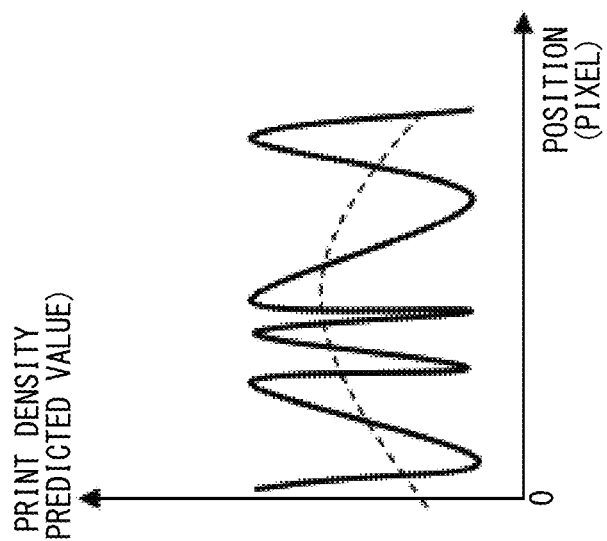
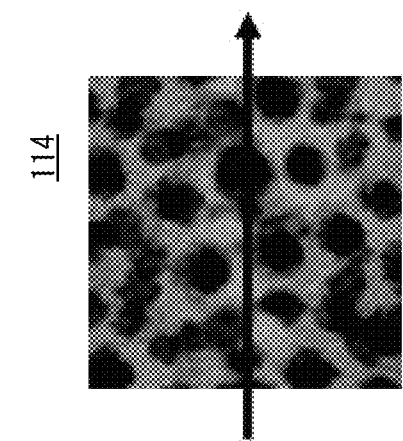
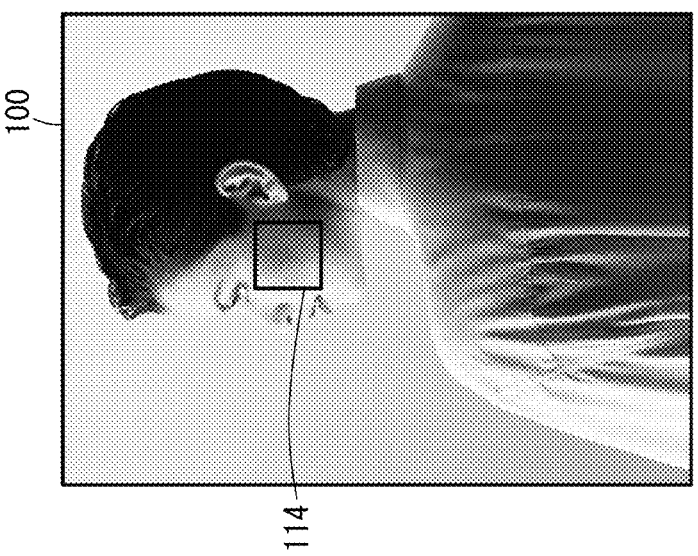

COLOR CONVERSION DEVICE, COLOR CONVERSION METHOD, RECORDING MEDIUM, AND COLOR SEPARATION DEVICE

CROSS-REFERENCE TO RELATED APPLICATIONS AND PRIORITY CLAIMS

This application is a Continuation of International Application No. PCT/JP2012/050049 filed on Jan. 5, 2012, which was published under PCT Article 21(2) in Japanese, which is based upon and claims the benefit of priority from Japanese Patent Application No. 2011-069268 filed on Mar. 28, 2011, the contents all of which are incorporated herein by reference.

TECHNICAL FIELD

The present invention relates to a color conversion apparatus (device), a color conversion method, a recording medium, and a color separation apparatus (device) for converting colors of a print that is produced using a plurality of color materials.

BACKGROUND ART

With significant advances in inkjet technology in recent years, it is becoming possible for inkjet image forming devices to produce large color prints of high quality at high speeds. Inkjet image forming devices are widely used particularly in sign and display applications, and are applicable to, for example, prints on POP (Point Of Purchase) posters, wall posters, outdoor advertisements, billboards, etc. Inkjet image forming devices are capable of producing prints by forming a number of ink dots, approximately several tens μm in diameter, on a print medium by applying droplets of different color inks, e.g., C, M, Y, K inks, to the print medium.

It is known in the art, according to human visual response characteristics, that human color vision is most sensitive to shades of gray. More specifically, if dots printed in different colors are of the same size, then dots in a K ink can be perceived visually better than the dots in other C, M, Y inks. Therefore, an observer of an image produced using an increased amount of K ink sees the image as grainy in its entirety (the granularity level is high) although the observer fails to identify individual dots.

If dots printed in C, M, Y inks are present closely together to form gray areas (composite black areas), then such dots provide a smoothing effect due to being superposed on each other, thereby lowering the image granularity level. However, since three inks are used rather than one ink, the total amount of inks used increases, thereby resulting in a high running cost (hereinafter referred to simply as "cost").

According to inkjet technology, therefore, there is a trade-off between granularity level and cost, and it is important to design images so that granularity level and cost will be well-balanced. Various color conversion techniques have been proposed in the art for appropriately controlling the total amount of inks used by finely adjusting a dot recording ratio while keeping the dots substantially isochromatic.

Japanese Laid-Open Patent Publication No. 2000-078418 discloses a method of and an apparatus for predicting an image equality prediction value relative to the quality of a printed image based on a certain detected color signal, and determining the amount of a K toner to be used based on the image equality prediction value.

Japanese Laid-Open Patent Publication No. 2009-241609 discloses an apparatus for and a method of judging whether or not chromatic or achromatic dots are to be formed based on an input signal. The publication states that a pale K ink is used instead of a dark K ink in a color area where dot shapes are visible, thereby increasing the granularity level.

SUMMARY OF INVENTION

Input signals based on which prints are to be produced are available in various attributes and types. One image area includes regions in which there are many colors that are more noticeable, as well as many colors that are less noticeable. One image area also includes regions in which there are many low spatial frequency components, as well as regions where there are many high spatial frequency components.

According to the apparatuses and methods disclosed in Japanese Laid-Open Patent Publication No. 2000-078418 and Japanese Laid-Open Patent Publication No. 2009-241609, combinations of color materials are merely changed depending on whether or not they belong to a given color area. The granularity level and cost of certain input images may not be well balanced, but only one of granularity and cost may be improved depending on characteristics thereof.

The present invention has been made in order to solve the aforementioned problems. It is an object of the present invention to provide a color conversion apparatus, a color conversion method, and a recording medium, which are capable of producing prints that are both low in cost and granularity level.

According to the present invention, there is provided a color conversion apparatus for converting colors of a print that is produced using a plurality of color materials, comprising a color signal input unit for inputting device color signals associated with respective amounts of used color materials, an adjustment area extractor for extracting at least one of granularity level adjustment areas, in which a granularity level of an image is adjusted, from an image area represented by the device color signals input from the color signal input unit, a target value setter for setting a target value for the granularity level in the one of the granularity level adjustment areas that is extracted by the adjustment area extractor, a granularity level calculator for calculating the granularity level in the extracted one of the granularity level adjustment areas, and an isochromatic converter for converting the device color signals in the extracted one of the granularity level adjustment areas into new device color signals, such that the granularity level calculated by the granularity level calculator is closer to the target value set by the target value setter than before the device color signals are converted, and such that the new device color signals fall within an isochromatic range in a device-independent color space.

As described above, the color conversion apparatus includes the adjustment area extractor, which extracts at least one of granularity level adjustment areas, in which a granularity level of an image is adjusted, from an image area represented by device color signals that are input, the target value setter, which sets a target value for the granularity level in the extracted one of the granularity level adjustment areas, the granularity level calculator, which calculates the granularity level in the extracted one of the granularity level adjustment areas, and the isochromatic converter, which converts the device color signals in the extracted one of the granularity level adjustment areas, such that the granularity level is closer to the target value before the device color signals are converted. Consequently, the total amount of used color materials can be selectively increased or decreased depending on the image area, for thereby producing a print that is both low in granularity level and in cost.

If the granularity level is to be reduced in a case where the device color signals are converted, the isochromatic converter preferably converts the device color signals in order to make a total amount of color materials used in the granularity level adjustment area greater than before the device color signals are converted.

The color materials preferably include an achromatic color material and a plurality of chromatic color materials, and if the chromatic color materials are capable of being combined to reproduce a color on the print that can be produced by the achromatic color material, the isochromatic converter preferably converts the device color signals such that an amount of used achromatic color material in the granularity level adjustment area is reduced from an amount before the device color signals are converted, and a total amount of used chromatic color materials in the granularity level adjustment area is increased from a total amount before the device color signals are converted. If the total amount of color materials used to produce a print is increased, a desired image quality level is achieved in the granularity level adjustment area by reducing the granularity level to an appropriate value, and by increasing the amount of used color materials to an appropriate value.

If the granularity level is to be increased in a case where the device color signals are converted, the isochromatic converter preferably converts the device color signals in order to make a total amount of color materials used in the granularity level adjustment area smaller than before the device color signals are converted.

The color materials preferably include an achromatic color material and a plurality of chromatic color materials, and if the chromatic color materials are capable of being combined to reproduce a color on the print that can be produced by the achromatic color material, the isochromatic converter preferably converts the device color signals such that an amount of used achromatic color material in the granularity level adjustment area is increased from an amount before the device color signals are converted, and a total amount of used chromatic color materials in the granularity level adjustment area is reduced from a total amount before the device color signals are converted. If the total amount of color materials used to produce a print is reduced, a desired image quality level is achieved in the granularity level adjustment areas by increasing the granularity level to an appropriate value, and by reducing the amount of used color materials to an appropriate value.

The adjustment area extractor preferably extracts a facial area as the granularity level adjustment area.

The adjustment area extractor preferably extracts, as the granularity level adjustment area, an achromatic flat area, a saturation of which is smaller than a first threshold value and a spatial frequency of which is lower than a second threshold value.

According to the present invention, there also is provided a color conversion method of converting colors of a print that is produced using a plurality of color materials, comprising the steps of inputting device color signals associated with respective amounts of used color materials, extracting at least one of granularity level adjustment areas, in which a granularity level of an image is adjusted, from an image area represented by the device color signals that are input, setting a target value for the granularity level in the extracted one of the granularity level adjustment areas, calculating the granularity level in the extracted one of the granularity level adjustment areas, and converting the device color signals in the extracted one of the granularity level adjustment areas into new device color signals, such that the granularity level which is calculated is closer to the set target value than before the device color signals are converted, and such that the new device color signals fall within an isochromatic range in a device-independent color space.

According to the present invention, there further is provided a non-transitory recording medium storing a program for converting colors of a print that is produced using a plurality of color materials, the program enabling a computer to function as a color signal input unit for inputting device color signals associated with respective amounts of used color materials, an adjustment area extractor for extracting at least one of granularity level adjustment areas, in which a granularity level of an image is adjusted, from an image area represented by the device color signals input from the color signal input unit, a target value setter for setting a target value for the granularity level in the one of the granularity level adjustment areas that is extracted by the adjustment area extractor, a granularity level calculator for calculating the granularity level in the extracted one of the granularity level adjustment areas, and an isochromatic converter for converting the device color signals in the extracted one of the granularity level adjustment areas into new device color signals, such that the granularity level calculated by the granularity level calculator is closer to the target value set by the target value setter than before the device color signals are converted, and such that the new device color signals fall within an isochromatic range in a device-independent color space.

According to the present invention, there further is provided a color separation apparatus comprising an adjustment area extractor for extracting at least one of granularity level adjustment areas, in which a granularity level of an image is adjusted, from an image area represented by device color signals that are input, a target value setter for setting a target value for the granularity level in the one of the granularity level adjustment areas that is extracted by the adjustment area extractor, a granularity level calculator for calculating the granularity level in the extracted one of the granularity level adjustment areas, and a color separation condition determiner for determining an item of color separation condition information from among a plurality of items of color separation condition information, for thereby separating the device color signals that are input into device color signals associated with respective amounts of used color materials, wherein the color separation condition determiner determines the item of color separation condition information such that the granularity level calculated by the granularity level calculator is closer to the target value set by the target value setter than other color separation conditions.

With the color conversion apparatus, the color conversion method, and the recording medium according to the present invention, at least one of granularity level adjustment areas, in which a granularity level of an image is adjusted, is extracted from an image area represented by device color signals that are input, a target value for the granularity level in the extracted granularity level adjustment area is set, the granularity level in the extracted granularity level adjustment areas is calculated, and the device color signals in the granularity level adjustment areas are converted, such that the granularity level is closer to the target value than before the device color signals are converted.

With the color separation apparatus according to the present invention, at least one of granularity level adjustment areas, in which a granularity level of an image is adjusted, is extracted from an image area represented by device color signals that are input, a target value for the granularity level in the extracted granularity level adjustment area is set, the granularity level in the extracted granularity level adjustment areas is calculated, and an item of color separation condition information is determined from among a plurality of items of color separation condition information, such that the granularity level is closer to the target value than other color separation conditions.

Consequently, the total amount of used color materials can be selectively increased or decreased depending on the image area, for thereby producing a print that is both low in granularity level and in cost.

BRIEF DESCRIPTION OF DRAWINGS

FIG. 3 is a flowchart of an operation sequence of the color conversion apparatus;

FIG. 8A is a diagram showing a rectangular area outside of a granularity level adjustment area;

FIG. 8B is an enlarged fragmentary diagram showing the rectangular area illustrated in FIG. 8A;

FIG. 8C is a diagram showing a microscopic density profile along the arrow shown in FIG. 8B;

FIG. 9A is a diagram showing a rectangular area inside of a granularity level adjustment area;

FIG. 9B is an enlarged fragmentary diagram showing the rectangular area illustrated in FIG. 9A;

FIG. 9C is a diagram showing a microscopic density profile along the arrow shown in FIG. 9B;

DESCRIPTION OF EMBODIMENTS

A color conversion method according to a preferred embodiment of the present invention, in relation to a color conversion apparatus (color separation apparatus) and a printing system that carry out the color conversion method, will be described in detail below with reference to the accompanying drawings. In the following description, the formation of an image may also be referred to as "printing".

First, a color conversion apparatus according to a first embodiment of the present invention will be described below with reference to FIGS. 1 through 10.

Figure 1:
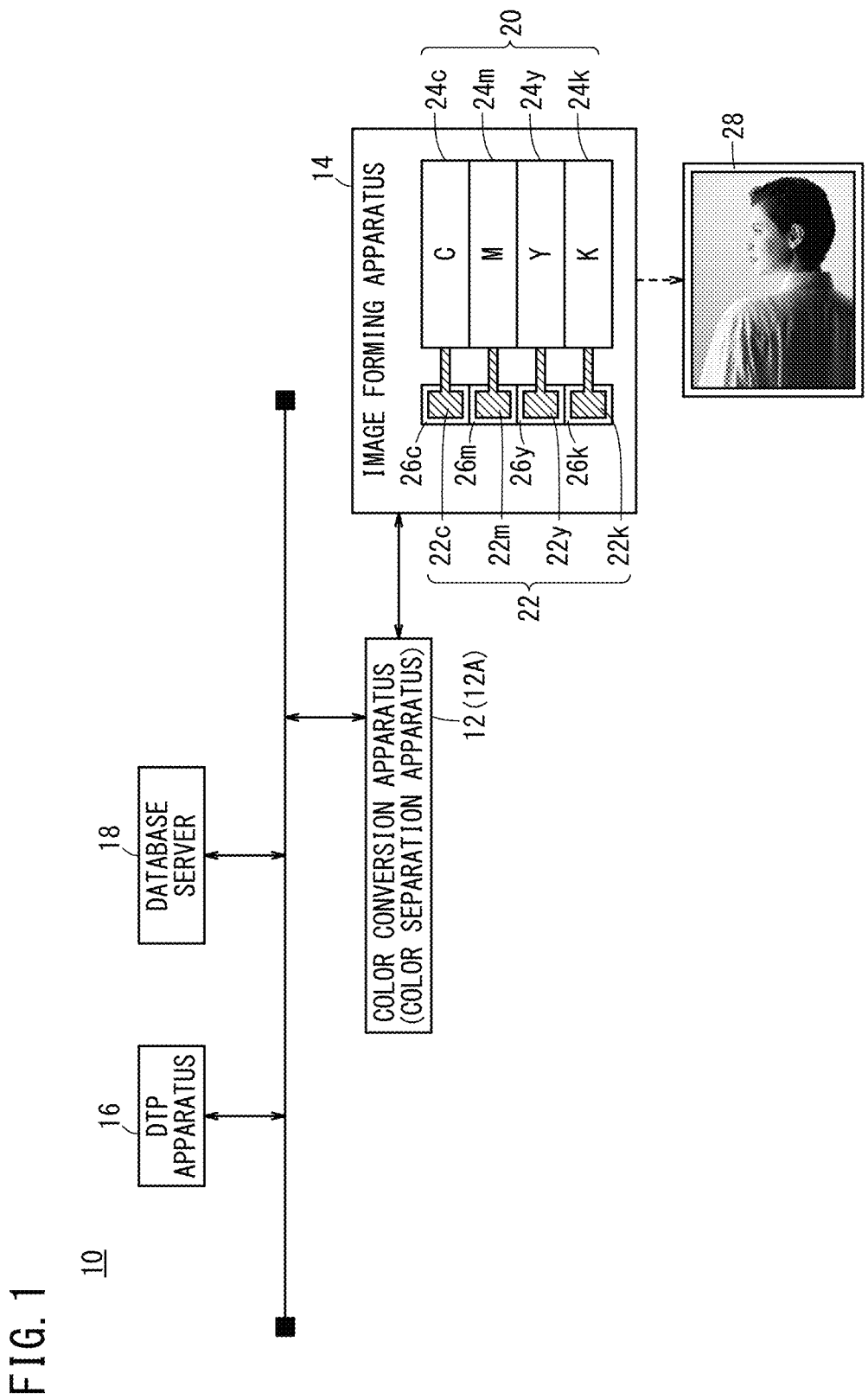
FIG. 1 is a block diagram of a printing system, which incorporates a color conversion apparatus according to a first embodiment of the present invention.

FIG. 1 shows in block form a printing system 10, which incorporates a color conversion apparatus 12 according to a first embodiment of the present invention (or a color separation apparatus 12A according to a second embodiment of the present invention).

As shown in FIG. 1, the printing system 10 basically includes a color conversion apparatus 12, an image forming apparatus 14, a DTP (DeskTop Publishing) apparatus 16, and a database server 18. The color conversion apparatus 12, the DTP apparatus 16, and the database server 18 are connected electrically to each other by a wired or wireless link.

The color conversion apparatus 12 converts input image data (device color signals or page description data) supplied from an external apparatus into device color signals suitable for use in the image forming apparatus 14 in order to produce a print based thereon. The color conversion apparatus 12 outputs the converted device color signals to the image forming apparatus 14. The device color signals represent color signals defined by device-dependent data, e.g., raster-format data, such as TIFF data, bitmap data, RAW data, or the like, having color channels in four colors of C, M, Y, K or three colors of R, G, B. The device color signals supplied to the image forming apparatus 14 may have a unique data format with a desired header added thereto.

The image forming apparatus 14 is connected electrically to the color conversion apparatus 12 through a serial interface such as a USB (Universal Serial Bus) cable, an IEEE1394 cable, an Ethernet (registered trademark) cable, a wireless network, or the like, or a parallel interface such as a Centronics cable.

The image forming apparatus 14 comprises an inkjet printer for forming an image on a medium (recording medium), not shown, by discharging ink droplets from a recording head assembly 20 while the medium is fed in a predetermined direction. The medium includes a base, which may comprise a paper medium such as synthetic paper, thick paper, aluminum-evaporated paper, or the like, a resin medium such as vinyl chloride, PET, or the like, or tarpaulin paper, or the like.

The recording head assembly 20 comprises four line heads 24$c$, 24$m$, 24$y$, 24$k$ that discharge droplets of four color materials, i.e., C ink 22$c$ (chromatic color material), M ink 22$m$ (chromatic color material), Y ink 22$y$ (chromatic color material), and K ink 22$k$ (achromatic color material), having different colors. The C ink 22$c$, the M ink 22$m$, the Y ink 22$y$, and the K ink 22$k$ may hereinafter be referred to collectively as "inks 22".

Each of the line heads 24$c$, 24$m$, 24$y$, 24$k$ has a plurality of nozzles, not shown, arrayed along the widthwise direction of the medium. The C ink 22$c$, the M ink 22$m$, the Y ink 22$y$, and the K ink 22$k$ are stored in respective ink tanks 26$c$, 26$m$, 26$y$, 26$k$. The line head 24$c$ discharges the C ink 22$c$, which is supplied from the ink tank 26$c$, through nozzles thereof. The line head 24$m$ discharges the M ink 22$m$, which is supplied from the ink tank 26$m$, through nozzles thereof. The line head 24$y$ discharges the Y ink 22$y$, which is supplied from the ink tank 26$y$, through nozzles thereof. The line head 24$k$ discharges the K ink 22$k$, which is supplied from the ink tank 26$k$, through nozzles thereof.

The recording head assembly 20 may have an ink droplet propelling mechanism of any of various different types. For example, the recording head assembly 20 may have an actuator in the form of a piezoelectric device, which serves as an ink droplet propelling mechanism that propels and ejects droplets of inks 22 in a case where the piezoelectric device is mechanically deformed based on control signals. Alternatively, the recording head assembly 20 may have a thermal jet mechanism, which serves as an ink droplet propelling mechanism that propels and ejects droplets of the inks 22 under the pressure of air bubbles, which are generated in a case where the inks 22 are heated by a heater. The recording head assembly 20 is not limited to a line head assembly, but may comprise a multipass head assembly, which is scanned reciprocally in transverse directions across the medium to thereby form an image on the medium.

The DTP apparatus 16 is capable of editing material data made up of characters, figures, pictures, photos, etc. The DTP apparatus 16 generates electronic manuscripts in a page description language (hereinafter referred to as "PDL") by laying the material data on each page. The term PDL refers to a language, which is descriptive of image information including format information, position information, color information (including density information), etc., of characters, figures, etc., in a "page" that serves as an output unit for printing, displaying, or the like. The DTP apparatus 16 performs a rasterizing process on electronic manuscripts in PDL format. The rasterizing process includes a data format conversion process for converting a PDL format into a raster format, and a color conversion process using an ICC (International Color Consortium) profile.

The database server 18 is an apparatus for managing data such as job tickets of electronic manuscripts, e.g., JDF (Job Definition Format) files, color sample data, target profiles, or device profiles, which are suitable for the combination of the image forming apparatus 14 and the medium.

Figure 2:
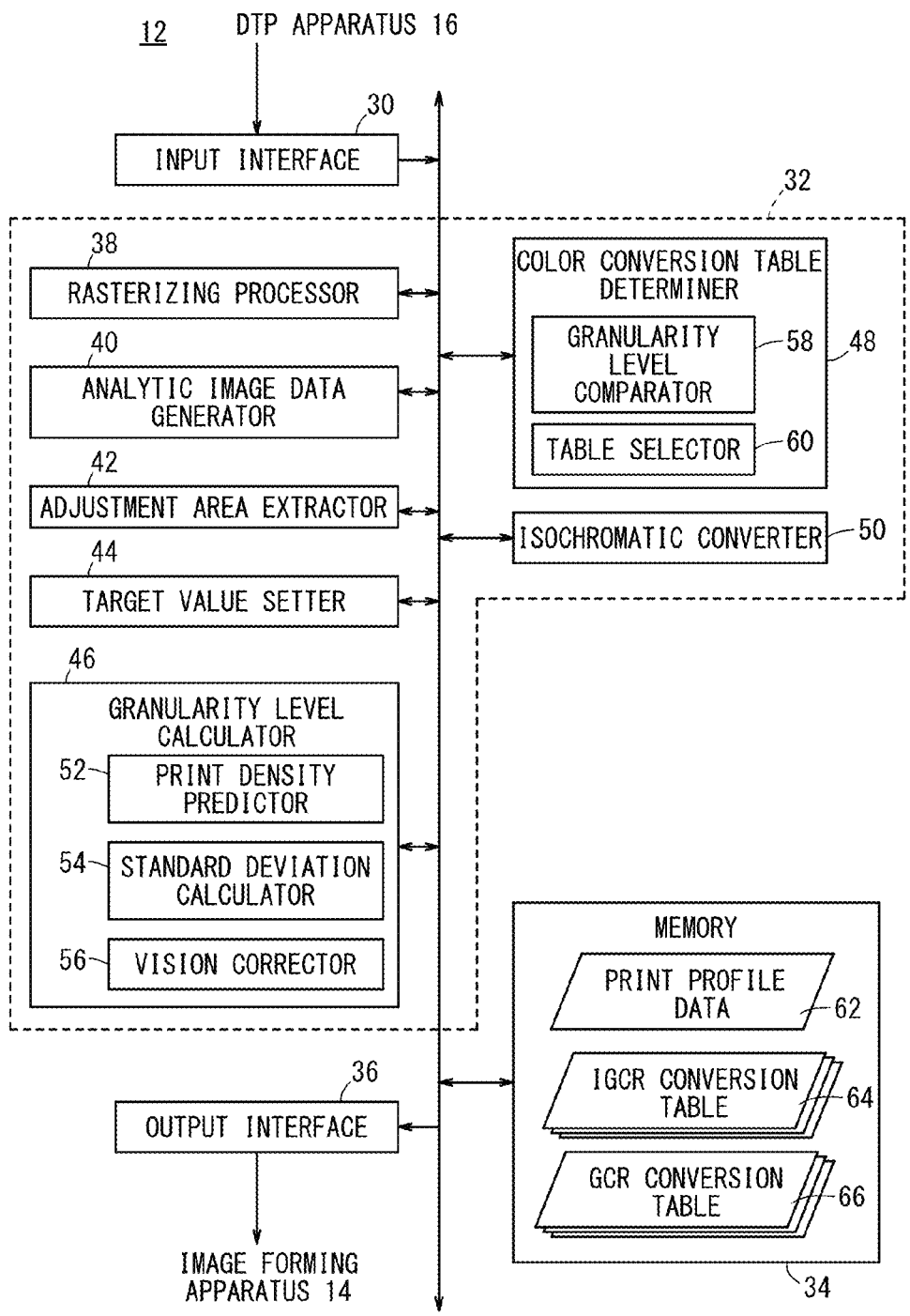
FIG. 2 is an electric block diagram of the color conversion apparatus shown in FIG. 1.

FIG. 2 is an electric block diagram of the color conversion apparatus 12 shown in FIG. 1.

The color conversion apparatus 12 includes an input interface 30 (color signal input unit), a controller 32, a memory 34 (recording medium), and an output interface 36. The memory 34 stores a program for controlling the controller 32 so as to function as the color conversion apparatus 12 according to the first embodiment (or the color separation apparatus 12A according to the second embodiment).

The input interface 30 receives electric signals from an external apparatus. For example, the input interface 30 acquires device color signals and PDL data, which are generated and edited by the DTP apparatus 16, as well as acquiring various items of information such as ICC profiles or the like that are stored in the database server 18.

The output interface 36 sends electric signals to an external apparatus. For example, the output interface 36 supplies device color signals, which are processed using a color conversion process according to the present invention, to the image forming apparatus 14. The color conversion process is a process for converting only the signal value of a device color signal (e.g., C, M, Y, K signal data) without changing the types of color plates. A device color signal before conversion thereof will hereinafter be referred to as a "pre-conversion color signal", and a device color signal after conversion thereof will be referred to as a "post-conversion color signal".

Device color signals (pre-conversion color signals and post-conversion color signals), which are input and output, are associated with the amounts of used inks 22 in the image forming apparatus 14. Such an association may be designed as desired for each color channel. For example, the used amount "0%" may be assigned to a device color signal representing a lowest gradation level, the used amount "100%" may be assigned to a device color signal representing a highest gradation level, and linearly changing used amounts may be assigned to device color signals that represent intermediate gradation levels between the lowest and highest gradation levels.

The controller 32, which comprises an information processor such as a CPU or the like, includes a rasterizing processor 38, an analytic image data generator 40, an adjustment area extractor 42, a target value setter 44, a granularity level calculator 46, a color conversion table determiner 48, and an isochromatic converter 50.

The rasterizing processor 38 carries out the same rasterizing function as the DTP apparatus 16. Depending on the type of input data, the rasterizing processor 38 performs a rasterizing process on the input data. If device color signals are supplied directly to the input interface 30, then the rasterizing processor 38 does not need to perform a rasterizing process on the input data.

The analytic image data generator 40 generates analytic image data from a pre-conversion color signal, which is acquired from the input interface 30 or the rasterizing processor 38. More specifically, the analytic image data generator 40 performs a color conversion process in order to convert the pre-conversion color signal into device-independent data. The term device-independent data refers to data, which are defined in a color system such as HSV (Hue-Saturation-Value), HLS (Hue-Lightness-Saturation), CIELAB, CIELUV, XYZ, or the like.

Using print profiles depending on the image forming apparatus 14, for example, the analytic image data generator 40 generates L*a*b* data, YCC data, or the like, from the pre-conversion color signal.

The adjustment area extractor 42 extracts a granularity level adjustment area in which a granularity level (hereinafter referred to as a "granularity level GR") of an image is adjusted from within a given image area. In a case where the granularity level in the granularity level adjustment area is adjusted, the granularity level may be increased or decreased. The granularity level GR is improved as the value thereof becomes smaller.

The target value setter 44 sets a target value Gt for the granularity level GR with respect to the granularity level adjustment area extracted by the adjustment area extractor 42. The target value setter 44 may set a target value Gt, depending on either an attribute of the granularity level adjustment area or in response to an input action made by the user through a GUI.

Based on device color signals and output characteristics of the image forming apparatus 14, the granularity level calculator 46 calculates the granularity level GR in the granularity level adjustment area. The granularity level calculator 46 includes a print density predictor 52 for predicting a print density (microscopic density profile) based on the device color signals and the output characteristics of the image forming apparatus 14, a standard deviation calculator 54 for calculating a standard deviation of the print density in the given image area based on the microscopic density profile that is predicted by the print density predictor 52, and a vision corrector 56 for correcting a standard deviation of the print density calculated by the standard deviation calculator 54, thereby acquiring a granularity level GR as an index, which is associated with the visibility (granular feel) of the image.

The color conversion table determiner 48 designates a plurality of color conversion tables (also referred to as "candidate tables") that can be used in the color conversion process, and selects and determines a color conversion table from among the candidate tables (hereinafter referred to as a "candidate table group"). The color conversion table determiner 48 includes a granularity level comparator 58 for comparing and evaluating the granularity level GR calculated by the granularity level calculator 46 and the target values Gt set by the target value setter 44, and a table selector 60 for selecting a color conversion table from among the candidate table group, based on the compared and evaluated results from the granularity level comparator 58.

Using a color conversion table having a predetermined data format, the isochromatic converter 50 converts input device color signals into new device color signals, which are output such that the new device color signals will fall within an isochromatic range in a device-independent color space. Depending on the type of color conversion table used, the isochromatic converter 50 performs any one of an IGCR (Inverse Gray-Component Replacement) conversion process, a GCR (Gray-Component Replacement) conversion process, or an equivalent conversion process. The IGCR conversion process and the GCR conversion process are effective for cases in which the C ink 22c, the M ink 22m, and the Y ink 22y, which are plural chromatic color materials, are combined in order to reproduce colors on a print 28, which can be produced by the K ink 22k, which is an achromatic color material. Details of the IGCR conversion process and the GCR conversion process will be described later.

The memory 34 stores print profile data 62 suitable for the image forming apparatus 14, IGCR conversion tables 64 for use in the IGCR conversion process, and GCR conversion tables 66 for use in the GCR conversion process. The memory 34 may also store pre-conversion color signals, post-conversion color signals, analytic image data, and various other items of information required for the color conversion process according to the present invention.

The color conversion apparatus 12 according to the first embodiment is configured basically as described above. Operations of the color conversion apparatus 12 will be described in detail below with reference to the flowchart shown in FIG. 3.

First, device color signals are input to the color conversion apparatus 12 through the input interface 30 (step S1). The device color signals may be supplied to the color conversion apparatus 12 in two signal entry modes.

According to a first signal entry mode, the DTP apparatus 16 generates a PDL electronic manuscript according to an editing process, and then rasterizes the generated PDL electronic manuscript into device color signals, i.e., C, M, Y, K signal data, for use in printing. The generated device color signals are supplied from the DTP apparatus 16 to the color conversion apparatus 12 through the input interface 30.

According to a second signal entry mode, the DTP apparatus 16 generates a PDL electronic manuscript according to an editing process, and then supplies the generated PDL electronic manuscript to the image forming apparatus 14. Thereafter, the rasterizing processor 38 reads the print profile data 62 stored in the memory 34, and rasterizes the supplied PDL electronic manuscript into device color signals, i.e., C, M, Y, K signal data, for use in printing.

Then, the analytic image data generator 40 performs a given color conversion process on the device color signals in order to generate analytic image data (step S2). The analytic image data generator 40 generates, for example, YCC data for use in a later-described face detecting process, as well as L*a*b* data for use in a later-described isochromatic conversion process.

The supplied device color signals and the generated analytic image data are stored temporarily in the memory 34.

Thereafter, the adjustment area extractor 42 extracts a granularity level adjustment area, in which the image granularity level GR is adjusted, from an image area represented by the device color signals (step S3). More specifically, the adjustment area extractor 42 reads the device color signals and the analytic image data from the memory 34, and then applies various area detecting algorithms to the device color signals and the analytic image data in order to extract a granularity level adjustment area. Specific examples of area detecting algorithms will be described below.

In the first example, a detected facial area may be set as a granularity level adjustment area, due to the fact that the human face is a typical object, image quality of which can easily be evaluated as good or bad.

A facial area may be detected by any of various known image processing technologies, such as those disclosed in Japanese Laid-Open Patent Publication No. 2006-285959 and Japanese Laid-Open Patent Publication No. 2007-148537. Analytic image data that are used to detect the facial area may be of any known type. For example, if YCC data are used, then a known detecting process incorporated in an input device such as a digital camera or the like may be applied.

In the second example, an achromatic flat area may be set as a granularity level adjustment area, due to the fact that human visual response characteristics (contrast resolution) are maximum for a gray color and a spatial frequency band in the vicinity of 1 Cy/mm. The achromatic flat area refers to an image area the saturation of which is smaller than a first threshold value and the spatial frequency of which is lower than a second threshold value. More specifically, the first threshold value may be 5 and the second threshold value may be 1.0 Cy/mm (the number of corresponding pixels varies depending on the resolution). The first and second threshold values are not limited to the above values, and may be set to desired values depending on printing conditions and conditions of observation.

In the third example, a flat image area having a memory color may be set as a granularity level adjustment area. The term memory color refers to a certain color, which is stored and recalled by a human, who acts as an observer, in association with given content. For example, the memory color associated with the human face is a flesh color, the memory color associated with a sunset glow is orange, and the memory color associated with cherry blossoms is pink. A flat image area may be detected not only in view of the color of the image area, but also in view of attributes of the scene.

In the second and third examples, the flat area may be detected according to known pattern detecting algorithms, including a Fourier transform, a wavelet transform, a pattern matching algorithm, and a static process. In addition, the flat area may be detected as a cluster of pixels, by performing a joined component labeling process on the analytic image data or the device color signals.

Figure 4B:
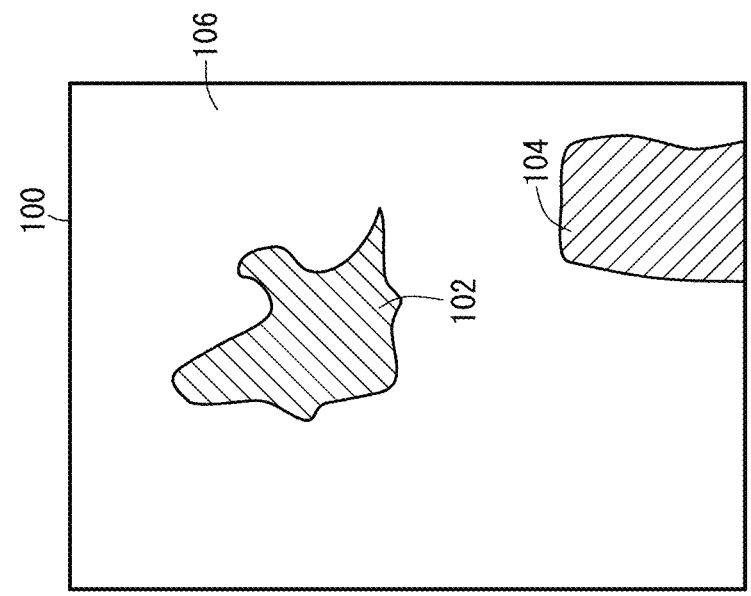
FIG. 4B is a view showing first image areas, which are extracted by an adjustment area extractor shown in FIG. 2.
Figure 4A:
FIG. 4A is a view showing a visual image represented by device color signals.

In this manner, granularity level adjustment areas 102, 104 are extracted from the image area 100 shown in FIG. 4A. FIG. 4A is a view showing a visual image, which is represented by device color signals. The image area 100 represents a natural picture of the upper half of the body of an upstanding woman substantially in the center thereof.

FIG. 4B is a view showing the granularity level adjustment areas 102, 104 that are extracted from the image area 100 by the adjustment area extractor 42. The granularity level adjustment area 102, which is present substantially centrally in the image area 100, corresponds to a detected facial area. The granularity level adjustment area 104, which is present in a lower right region of the image area 100, corresponds to a detected achromatic flat area. The blank area shown in FIG. 4B is a remaining image area 106, which remains after the granularity level adjustment areas 102, 104 have been excluded from the image area 100.

The adjustment area extractor 42 supplies to the memory 34 area attribute information (indicative of whether or not a pixel belongs to the granularity level adjustment areas 102, 104) of each pixel in the image area 100. The memory 34 temporarily stores the supplied area attribute information.

In this manner, the adjustment area extractor 42 extracts at least one of the granularity level adjustment areas 102, 104 from the image area 100 (step S3).

According to the present invention, the extracted granularity level adjustment area is not limited to a facial area, which is detected as an area of interest. Rather, the remaining image area 106, which remains after excluding areas of interest from the image area 100, i.e., the granularity level adjustment areas 102, 104 in FIG. 4B, may be used as a granularity level adjustment area.

Next, the target value setter 44 sets target values Gt for the granularity level GR with respect to each of the granularity level adjustment areas 102, 104 that are extracted by the adjustment area extractor 42 (step S4). The target value setter 44 may set target values Gt depending on attributes of the granularity level adjustment areas 102, 104. For example, the target value setter 44 may set a small target value Gt with respect to an image area that requires a high level of image quality, and may set a large target value Gt with respect to an image area that requires a low level of image quality.

Furthermore, with respect to the granularity level adjustment area 102, which is extracted as an object (facial area), the target value setter 44 may set a target value Gt related to an attribute of the object. Alternatively, with respect to the granularity level adjustment area 104, which is extracted as a flat area, the target value setter 44 may set a target value Gt related to colors or spatial frequency of the flat area while taking into account standard human visual response characteristics (color separation capability, spatial separation capability). Alternatively, in response to an input action made by the user through a GUI, the target value setter 44 may set target values Gt with respect to the respective granularity level adjustment areas 102, 104.

Next, the color conversion table determiner 48 designates a candidate table group for use in the color conversion process (step S5). For example, the color conversion table determiner 48 designates the IGCR conversion tables 64 and the GCR conversion tables 66, which are stored in the memory 34, as a candidate table group. Details of the IGCR conversion process and the GCR conversion process will be described below with reference to FIGS. 5A through 7C.

Figure 5A:
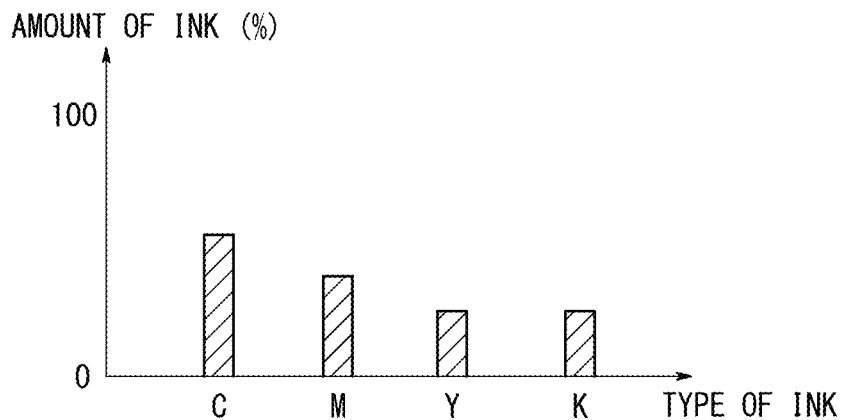
FIG. 5A is a graph showing a relationship between types and amounts of used inks before a conversion process.
Figure 5B:
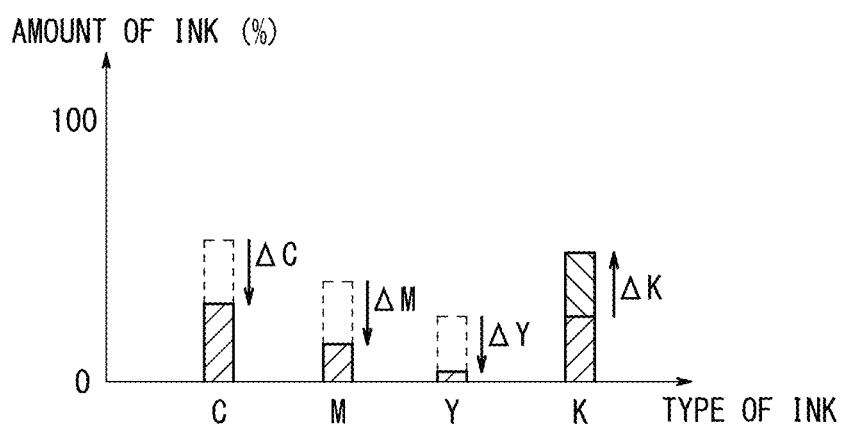
FIG. 5B is a graph showing a relationship between types and amounts of used inks after a GCR conversion process.
Figure 5C:
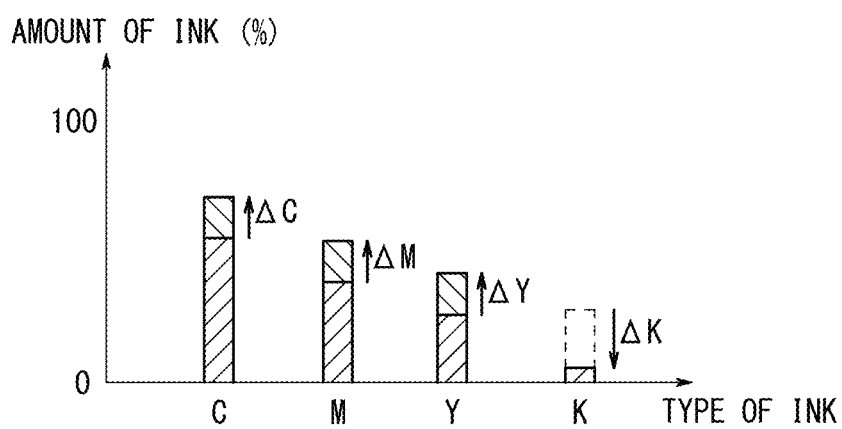
FIG. 5C is a graph showing a relationship between types and amounts of used inks after an IGCR conversion process.

FIG. 5A is a graph showing a relationship between types and amounts of used inks before a conversion process. FIG. 5B is a graph showing a relationship between types and amounts of used inks after the GCR conversion process. FIG. 5C is a graph showing a relationship between types and amounts of used inks after the IGCR conversion process.

In FIG. 5B, the C ink 22c, the M ink 22m, and the Y ink 22y are reduced respectively by $\Delta C$, $\Delta M$, $\Delta Y$ from the C ink 22c, the M ink 22m, and the Y ink 22y shown in FIG. 5A. The K ink 22k is increased by AK in order to cancel out a reduction in density caused by the reduction of the inks 22. In this manner, the total amount of used inks 22 is reduced by $(\Delta C + \Delta M + \Delta Y - \Delta K)$ while the color reproducibility of the print 28 (see FIG. 1) is kept substantially constant.

In FIG. 5C, the C ink 22c, the M ink 22m, and the Y ink 22y are increased respectively by $\Delta C$, $\Delta M$, $\Delta Y$ from the C ink 22c, the M ink 22m, and the Y ink 22y in FIG. 5A. The K ink 22k is reduced by AK in order to cancel out an increased in density caused by the increase of the inks 22. In this manner, the total amount of used inks 22 is increased by $(\Delta C + \Delta M + \Delta Y - \Delta K)$ while the color reproducibility of the print 28 (see FIG. 1) is kept substantially constant. Further, since the coverage ratio of the formed dots becomes higher, the granularity level is improved as a whole.

Figure 6A:
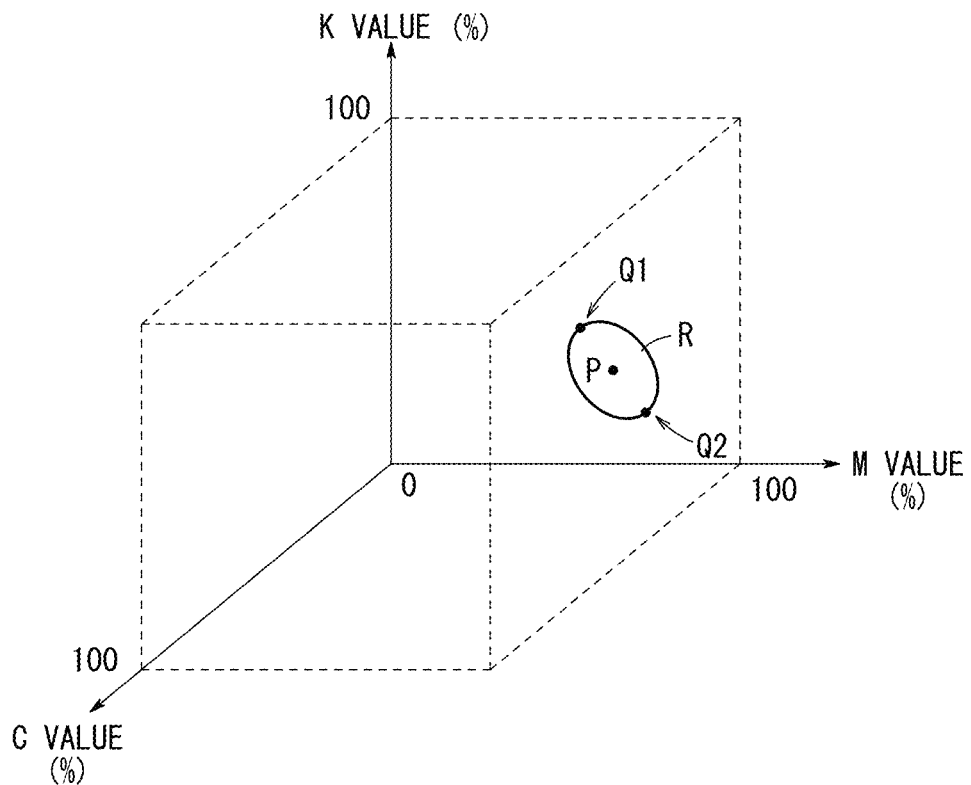
FIG. 6A is a diagram showing an isochromatic range in a device-independent color space.

FIG. 6A is a diagram showing an isochromatic range R in a device-independent color space. In the first embodiment, the inks 22 are available in four types, i.e., C, M, Y, K. However, in FIG. 6A, the inks are available in three types, i.e., C, M, Y, for illustrative purposes.

It is assumed that a point corresponding to a device color signal value prior to a conversion process is denoted by P. In a device-independent color space, e.g., a L*a*b* color space, a range in which the color difference $\Delta e$ with a color value corresponding to the point P is 0.5 or smaller (this numerical range may be changed as desired) is referred to as an isochromatic range R. In the color conversion process, any desired device color signal within the isochromatic range R is handled as being isochromatic with the point P.

As shown in FIG. 6A, a color that falls within the isochromatic range R around the point P and at which the K value (%) is maximum is represented by a point Q1. A GCR conversion table 66 is generated by determining points Q1 for points P in a device-dependent color space. A color that falls within the isochromatic range R around the point P and at which the K value (%) is minimum is represented by a point Q2. An IGCR conversion table 64 is generated by determining points Q2 for points P in a device-dependent color space.

Figure 6B:
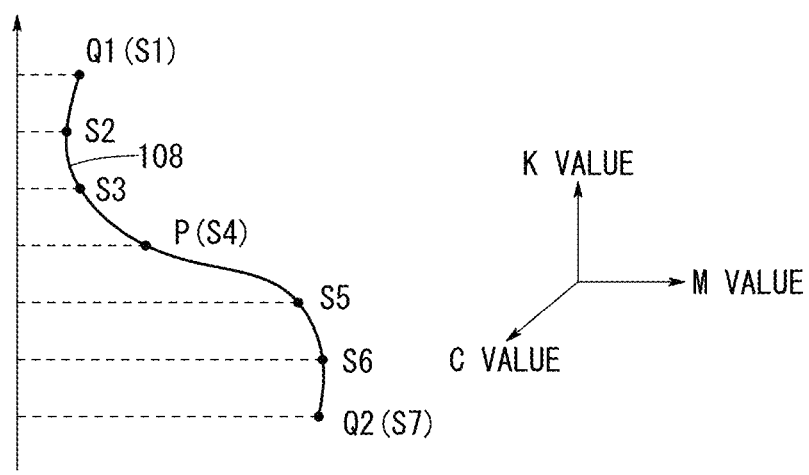
FIG. 6B is a diagram showing a designated example of a candidate table group.

As shown in FIG. 6B, candidate points S1 through S7 may be determined such that the K value is decremented at equal intervals along a path 108 from the point Q1 to the point Q2. In this case, seven color conversion tables (candidate tables) for converting (mapping) the points P to the candidate points S1 through S7 are generated. Since the K values of the post-conversion color signals (candidate points S1 through S3) are greater than those of the pre-conversion color signals (points P), the candidate tables corresponding to the candidate points S1 through S3 make up the GCR conversion tables 66. Since the K values of the post-conversion color signals (candidate points S5 through S7) are smaller than those of the pre-conversion color signals (points P), the candidate tables corresponding to the candidate points S5 through S7 make up the IGCR conversion tables 64. The candidate table corresponding to the candidate point S4 (point P) is an equivalent conversion table, which does not affect or change the device color signals.

The candidate points S1 through S7 may be determined by various known search algorithms. For example, using the print profile data 62 (see FIG. 2), L*a*b* color values may be calculated with respect to all of the colors in the vicinity of the point P, and then an optimum CMYK combination can be determined that satisfies certain limiting conditions. The optimum CMYK combination may be determined not only in view of color approximations, but also in view of gradation characteristics (e.g., continuity and smoothness of a gradation curve).

Figure 7A:
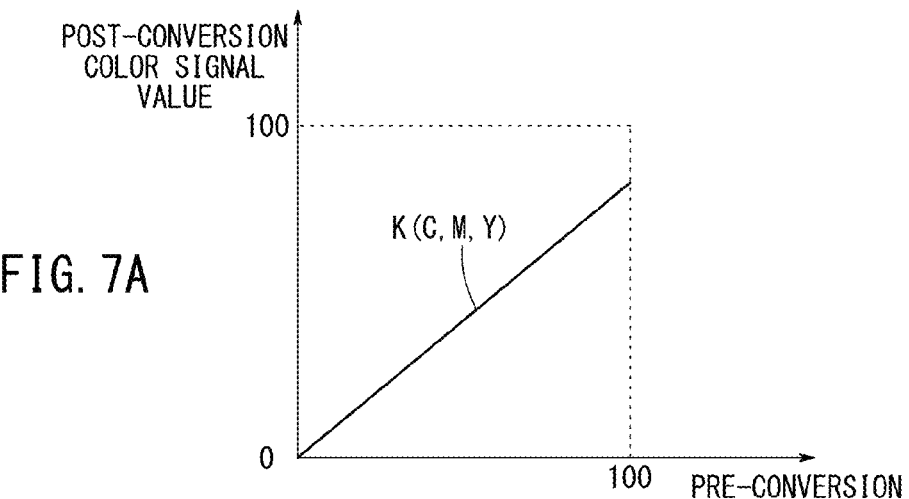
FIG. 7A is a graph showing conversion characteristics of an ordinary color conversion table for reproducing shades of gray.
Figure 7B:
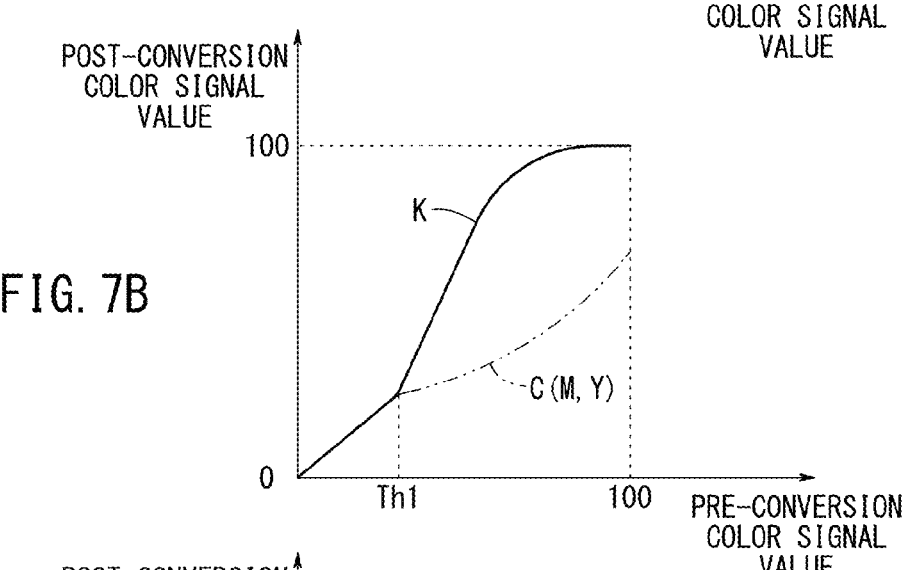
FIG. 7B is a graph showing conversion characteristics of a GCR color conversion table for reproducing shades of gray.
Figure 7C:
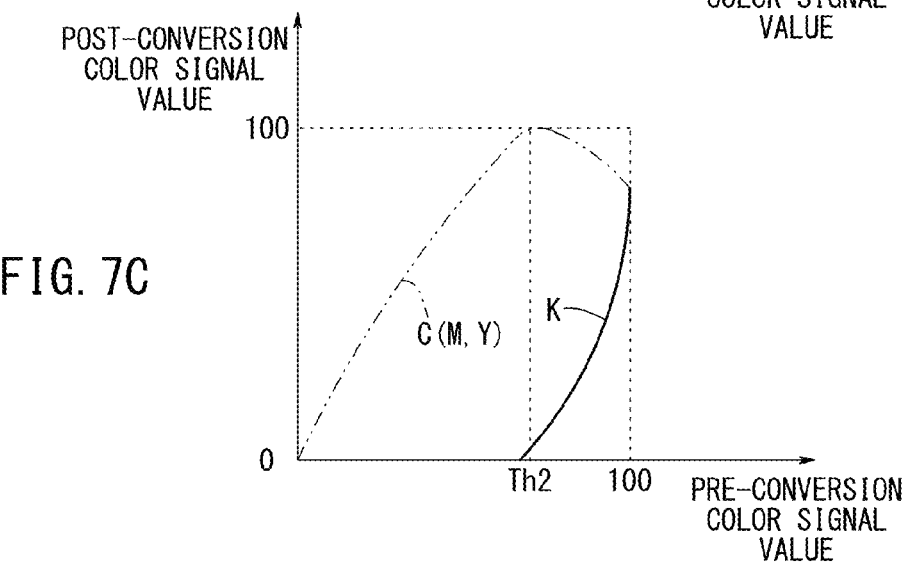
FIG. 7C is a graph showing conversion characteristics of an IGCR color conversion table for reproducing shades of gray.

Characteristics of the GCR conversion tables 66 and the IGCR conversion tables 64, which are obtained in the foregoing manner, will be described below. FIGS. 7A through 7C are graphs showing conversion characteristics of color conversion tables for reproducing shades of gray. Each of the graphs has a horizontal axis representing pre-conversion color signal values (%) and a vertical axis representing post-conversion color signal values (%).

The graph illustrated in FIG. 7A shows conversion characteristics of an ordinary color conversion table. The graph does not represent an equivalent transformation (Y=X), but rather represents a linear curve having a gradient that is slightly smaller than 1. This is because the total amount of used inks 22 is limited to less than 400%. The respective amounts of used inks 22 are the same at each gradation level of gray.

The graph illustrated in FIG. 7B shows conversion characteristics of the GCR conversion tables 66. The K value represents an equivalent transformation (Y=X) in a range of $0 \le K \le Th1$, and represents a curve having a high gradient in a range of $K \le Th1$, which is saturated near 100% within a range of high color signal values. Another color (e.g., a C value) represents an equivalent transformation (Y=X) in a range of $0 \le C \le Th1$, and represents a curve having a low gradient in a range of C Th1, which increases monotonically up to a maximum range (100%). Within a range beyond Th1, the ratio of K is greater than the ratio of the other colors (C, M, Y). As can be understood from FIG. 7B, the GCR conversion tables 66 are effective to reduce the total amount of used inks 22 in a range from Th1 to 100%.

The graph illustrated in FIG. 7C shows conversion characteristics of the IGCR conversion tables 64. The K value is 0% at all times in a range of $0 \le K \le Th2$, and is non-zero and sharply increases in a range of $K \ge Th2$. Another color (e.g., a C value) represents in a range of $0 \le C \le Th2$ an upwardly convex monotonically increasing function, which reaches a maximum value of 100% at C=Th2, and then gradually decreases in a range of $C \ge Th2$. Within the overall range, the ratio of K is smaller than the ratio of the other colors (C, M, Y). As can be understood from FIG. 7C, the IGCR conversion tables 64 are effective to increase the total amount of used inks 22 in a range from 0 to 100%.

The color conversion table determiner 48 designates, as a candidate table group, IGCR conversion tables 64 in order to increase the total amount of inks 22, and to thereby reduce the granularity level GR in the granularity level adjustment areas 102, 104. The color conversion table determiner 48 also designates, as a candidate table group, GCR conversion tables 66 in order to decrease the total amount of inks 22, and to thereby increase the granularity level GR in the granularity level adjustment areas 102, 104 (step S5).

The types or number of color conversion tables to be designated as the candidate table group may be changed depending on the set target values Gt. For example, if the target values Gt are small, then the candidate table group is effective to increase the number of IGCR conversion tables 64 and decrease the number of GCR conversion tables 66. On the other hand, if the target values Gt are large, then the candidate table group is effective to decrease the number of IGCR conversion tables 64 and increase the number of GCR conversion tables 66.

Thereafter, the granularity level calculator 46 calculates respective granularity levels GR in the granularity level adjustment areas 102, 104, in the event that a color conversion process has been carried out using the designated candidate tables (step S6). Process details for calculating respective granularity levels GR in the granularity level adjustment areas 102, 104 will be described in detail below.

First, using the device color signals, which are to be converted into colors, and the color conversion tables intended for evaluation, the analytic image data generator 40 generates analytic image data (C, M, Y, K signal data) for calculating granularity levels GR. Thereafter, using the C, M, Y, K signal data generated by the analytic image data generator 40 and the output characteristics of the image forming apparatus 14, the print density predictor 52 predicts print colors (print densities) on the print 28 (see FIG. 1). The output characteristics of the image forming apparatus 14 include various items of information concerning the colors, shapes, and sizes of dots, the type of print mode, inherent properties of the image forming apparatus 14, and the type of medium, as well as information in relation to formation of print densities.

For example, based on the C, M, Y, K signal data, the print density predictor 52 simulates colors and shapes of dots formed on the print 28 by the inks 22, thereby reproducing a microscopic density profile. Various mathematical models, including Neugebauer models, are applicable to the color reproduction process.

FIG. 8A is a diagram showing a rectangular area 112 outside of the granularity level adjustment area 102 (see FIG. 4B). FIG. 8B is an enlarged fragmentary diagram showing the rectangular area 112 illustrated in FIG. 8A. FIG. 8C is a diagram showing a microscopic density profile along the arrow shown in FIG. 8B.

As shown in FIGS. 8A and 8B, an image having a relatively flat density pattern is made up of a number of dots in four colors (C, M, Y, K) within the rectangular area 112. As shown in FIGS. 8B and 8C, the density is higher within dot-free regions and lower within dot-containing regions. In other words, the obtained density profile is flat macroscopically, and fluctuates microscopically and regularly about an average density, which is represented by the broken line in FIG. 8C.

FIG. 9A is a diagram showing a rectangular area 114 inside of the granularity level adjustment area 102 (see FIG. 4B). FIG. 9B is an enlarged fragmentary diagram showing the rectangular area 114 illustrated in FIG. 9A. FIG. 9C is a diagram showing a microscopic density profile along the arrow shown in FIG. 9B.

As shown in FIGS. 9A and 9B, an image having large density variations is made up of a number of dots in four colors (C, M, Y, K) within the rectangular area 114. As shown in FIGS. 9B and 9C, the density profile, which is obtained microscopically, fluctuates regularly about the curved density trend represented by the broken line in FIG. 9C.

From the predicted results (microscopic density profiles) shown in FIGS. 8C and 9C, the standard deviation calculator 54 shown in FIG. 2 calculates a standard deviation of the print density. An index representing fluctuations in print density is not limited to a standard deviation, but may be any of various statistical values including maximum amplitude, dispersion, etc.

Thereafter, the vision corrector 56 corrects the standard deviation, which was calculated by the standard deviation calculator 54, to thereby acquire a granularity level GR associated with the visibility (granular feel) of the image. The granularity level GR may be associated with the visibility (granular feel) of the image, based on the result of a sensory evaluation process that has been carried out in advance, or according to a conversion equation based on a mathematical model.

Next, the granularity level comparator 58 compares the granularity level GR calculated by the granularity level calculator 46 with the target values Gt that are set by the target value setter 44, and evaluates the granularity level GR (step S7). Granularity levels GR that are calculated with respect to the candidate table group, which is made up of seven candidate tables corresponding to the candidate points S1 through S7, are represented by G1 though G7, respectively.

Thereafter, from among the candidate table group, the table selector 60 selects one color conversion table (step S8).

Figure 10:
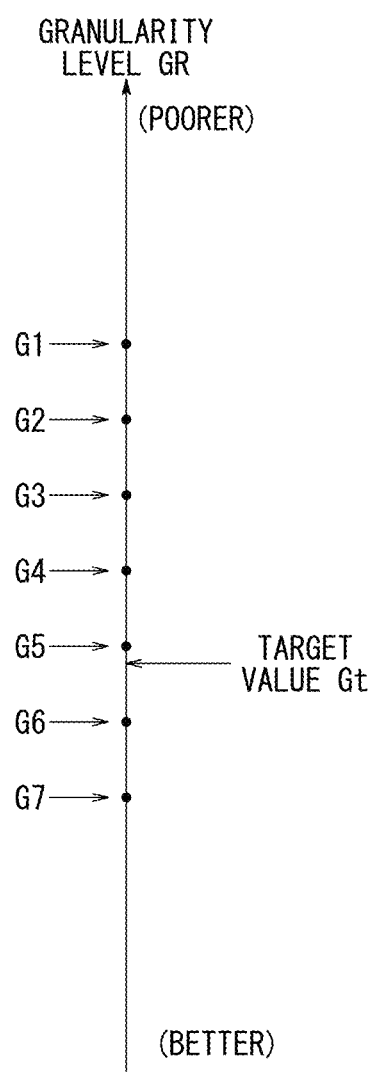
FIG. 10 is a diagram showing a relationship between a granularity level in the granularity level adjustment area and an established target value, at times that colors are converted using respective candidate tables.

FIG. 10 is a diagram showing a relationship between the granularity level GR in the granularity level adjustment area 102 and an established target value Gt, at times that colors are converted using each of the candidate tables. As described above, at the candidate point S1, where the amount of the K ink 22k used is the greatest, the granularity level GR is a maximum value (G1). As the amount of the K ink 22k used is gradually reduced at successive candidate points, which are spaced from the candidate point S1, the granularity level GR is lowered gradually. At the candidate point S7, where the amount of the K ink 22k used is the least, the granularity level GR is of a minimum value (G7).

The target value Gt is related to the values G1 through G7 such that the inequalities G6<Gt<G5 and (G5−Gt)<(Gt−G6) are satisfied. The table selector 60 may select a color conversion table corresponding to a value G5 that is closest to the target value Gt. The target value Gt may be interpreted as an allowable upper limit value, and the table selector 60 may select a color conversion table corresponding to the value G5 that is closest to the target value Gt without exceeding the target value Gt.

If a plurality of granularity level adjustment areas 102, 104 are extracted, then the table selector 60 may weigh the evaluation results of the granularity levels GR of the granularity level adjustment areas 102, 104, judge the weighted evaluation results, and select a color conversion table based on such a judgment.

Thereafter, the isochromatic converter 50 converts the device color signals using the color conversion table, which is determined by the color conversion table determiner 48 (step S9). At this time, the isochromatic converter 50 may convert the device color signals with respect to all of the pixels contained within the image area 100, or may convert the device color signals with respect to pixels that reside within the granularity level adjustment area 102.

Finally, the color conversion apparatus 12 outputs the converted device color signals (C, M, Y, K signal data) to the image forming apparatus 14 through the output interface 36 (step S10).

The image forming apparatus 14 converts the supplied device color signals into control signals, which are used for controlling discharge of inks 22 from the recording head assembly 20. The recording head assembly 20 discharges inks 22 based on the supplied control signals. The discharged droplets of inks 22 are applied to the surface of a medium, not shown, thereby forming a number of dots on the medium and printing an image (print 28).

As described above, at least one of granularity level adjustment areas 102, 104 for adjusting the granularity level GR of an image is extracted from an image area 100 represented by input device color signals, and a target value Gt is established for the granularity level GR with respect to the extracted one of the granularity level adjustment areas 102, 104. Granularity levels G1 through G7 are calculated in the granularity level adjustment areas 102, 104, and the device color signals in the granularity level adjustment areas 102, 104 are converted, so as to bring the granularity levels closer to the target value Gt than before the device color signals are converted (G4). In this manner, the total amount of inks 22 used is selectively increased or decreased depending on the image area 100, for thereby producing a print 28 that is both low in granularity level and in cost.

A printing system according to a second embodiment of the present invention will be described below with reference to FIGS. 11 and 12. The printing system according to the second embodiment is basically the same as the printing system according to the first embodiment (see FIG. 1), but differs therefrom in that the color conversion apparatus 12 is replaced with a color separation apparatus 12A, which separates device color signals into device color signals representative of different types of color plates.

Figure 11:
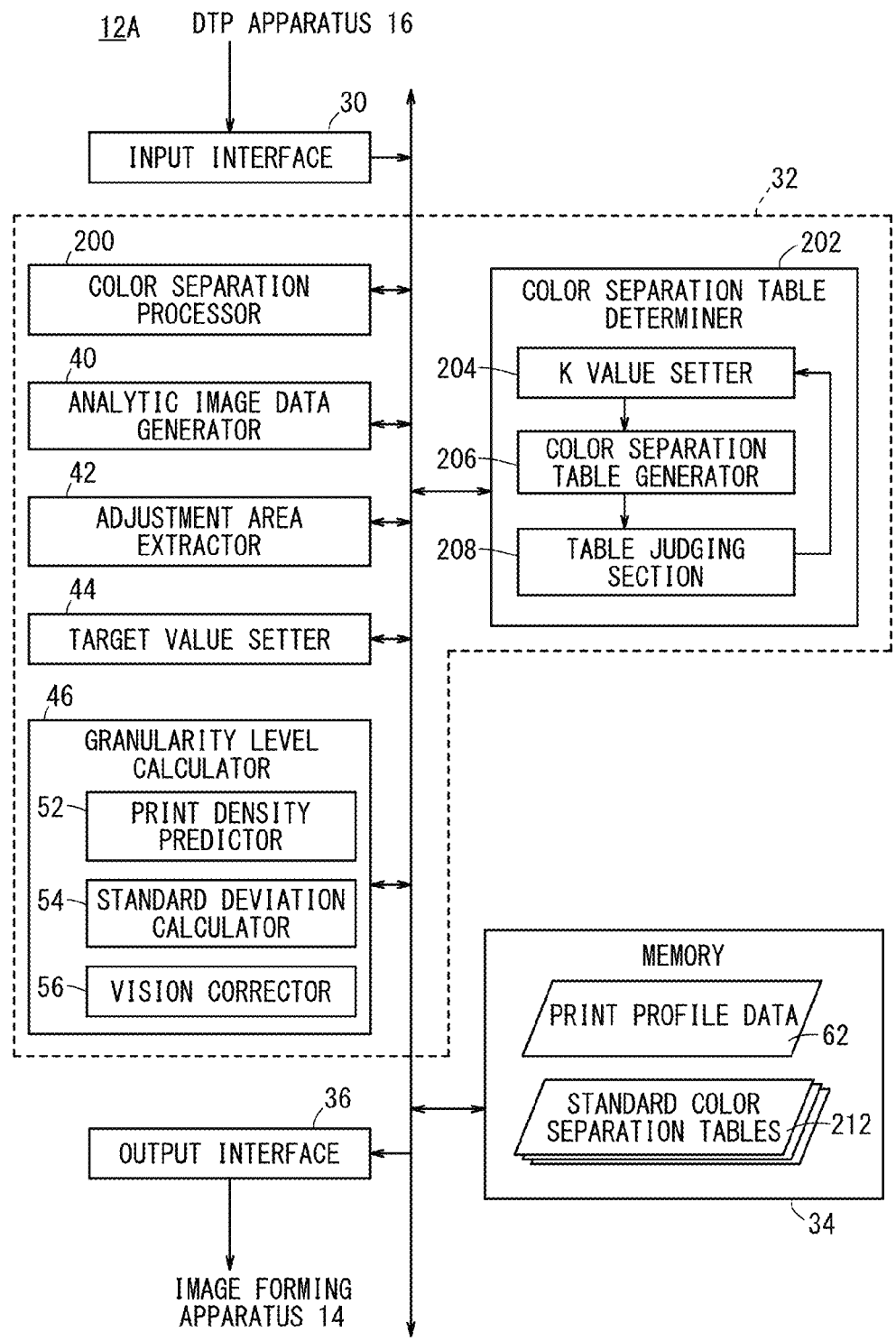
FIG. 11 is an electric block diagram of a color conversion apparatus according to a second embodiment of the present invention.
Figure 12:
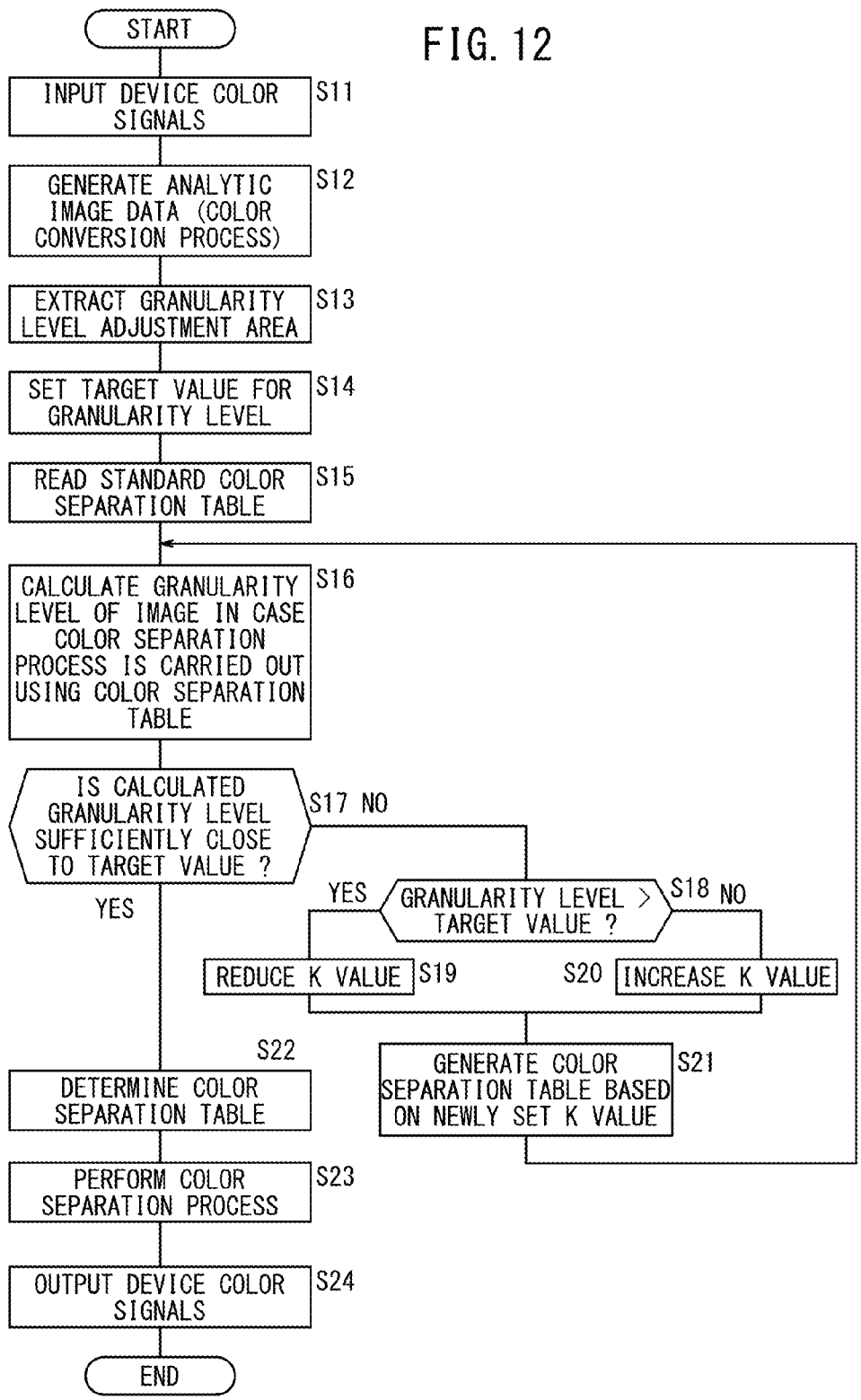
FIG. 12 is a flowchart of an operation sequence of a color separation apparatus, which functions as the color conversion apparatus shown in FIG. 11.

FIG. 11 is an electric block diagram of the color separation apparatus 12A according to the second embodiment.

The color separation apparatus 12A does not include the rasterizing processor 38, the color conversion table determiner 48, and the isochromatic converter 50 of the color conversion apparatus 12 (see FIG. 2). Instead, the color separation apparatus 12A includes a color separation processor 200 for separating input device color signals into device color signals representative of different types of color plates from the input device color signals, and a color separation table determiner 202 (color separation condition determiner) for determining a color separation table (color separation condition information), which is used in a color separation process carried out by the color separation processor 200.

The color separation condition information refers to various items of information for determining color separation conditions. For example, the color separation condition information includes the type and number of color plates represented by input and output signals, a color separation table (conversion LUT), coefficients of a conversion matrix, the form and coefficients of a conversion formula, and variables of a learning model, etc. Hereinafter, it will be assumed that a color separation table is used as the color separation condition information.

The color separation processor 200 separates a desired type of color plates (e.g., R, G, B signal data) into C, M, Y, K signal data. Preferably, the separated device color signals should be in agreement with the type of device color signals (C, M, Y, K signals in FIG. 1) used for controlling the image forming apparatus 14.

The color separation table determiner 202 determines a color separation table from among a plurality of color separation tables. The color separation table determiner 202 includes a K value setter 204 for presetting the K value of a generated color separation table, a color separation table generator 206 for generating a color separation table based on the K value preset by the K value setter 204, and a table judging section 208 for comparing and evaluating the granularity level GR calculated by the granularity level calculator 46 and the target value Gt established by the target value setter 44. The color separation table determiner 202 also judges whether or not the generated color separation table is appropriate.

The memory 34 stores standard color separation tables 212, which are used in a standard color separation process.

The color separation apparatus 12A according to the second embodiment is configured as described above. Operations of the color separation apparatus 12A will be described below with reference to the flowchart shown in FIG. 12. For the sake of brevity, operational steps of the color separation apparatus 12A, which are the same as corresponding operational steps (see FIG. 3) of the color conversion apparatus 12 according to the first embodiment, will not be described in detail below.

In steps S11 through S14, ranging from the input of device color signals until the target values Gt are set, the color separation apparatus 12A operates in the same manner as in steps S1 through S4 (see FIG. 3). The device color signals, which are input in step S11, represent color plates (e.g., R, G, B signal data) that differ from the color plates used for producing prints with the image forming apparatus 14.

Next, after having read a standard color separation table 212 from the memory 34 (step S15), in the event that a color separation process is to be carried out using the read standard color separation table 212 (step S16), the granularity level calculator 46 calculates granularity levels GR in the granularity level adjustment area 102, etc. At this time, using the device color signals on which the color separation process is carried out and the color separation tables to be evaluated, the analytic image data generator 40 generates analytic image data (C, M, Y, K signal data) for calculating granularity levels GR. A subsequent process for calculating granularity levels GR in the granularity level adjustment area 102, etc., may be the same as the process used for calculating granularity levels GR according to the first embodiment.

Thereafter, the table judging section 208 judges whether or not the granularity levels GR calculated by the granularity level calculator 46 are sufficiently close to the target values Gt (step S17). According to the first embodiment, a color conversion table is selected by evaluating and comparing a plurality of color conversion tables (candidate tables). According to the second embodiment, an allowable range for the target values Gt is determined in advance, and it is judged whether or not the calculated granularity levels GR fall within the allowable range.

If the table judging section 208 judges that the granularity levels GR are not sufficiently close to the target values Gt, then the table judging section 208 supplies the judgment result, the values of the granularity levels GR, and the target values Gt to the K value setter 204.

The K value setter 204 judges the relationship between magnitudes of each of the granularity levels GR and the target values Gt therefor (step S18). If the granularity level GR is greater than the target value Gt, then the K value setter 204 decrements the K value of the present color separation table (initially, the standard color separation table 212) by a predetermined value (step S19). If the granularity level GR is smaller than the target value Gt, then the K value setter 204 increments the K value of the present color separation table (initially, the standard color separation table 212) by a predetermined value (step S20).

Next, the color separation table generator 206 generates a new color separation table based on the K value, which is newly set by the K value setter 204 (step S21). The color separation table generator 206 may generate a new color separation table according to any of various known algorithms. Thereafter, control returns to step S16, and steps S16 through S21 are repeated until the table judging section 208 determines that the granularity levels GR are sufficiently close to the target values Gt.

If the table judging section 208 judges that the granularity levels GR are sufficiently close to the target values Gt, the color separation table determiner 202 determines the present color separation table as a color separation table to be used in the color separation process (step S22). The color separation processor 200 separates the input R, G, B signal data into C, M, Y, K signal data (step S23).

Finally, the color conversion apparatus 12 outputs the color-separated device color signals (C, M, Y, K signal data) to the image forming apparatus 14 through the output interface 36 (step S24).

As described above, the color separation process is carried out after one of a plurality of color separation tables (color separation condition information) has been selected in order to make the calculated granularity level GR closer to the target value Gt than other color separation conditions. The above color separation process, which is carried out in this manner, offers the same advantages as those of the first embodiment.

The present invention is not limited to the above embodiments. Rather, various changes and modifications may be made to the embodiments without departing from the scope of the invention.

For example, according to the first embodiment, a color conversion process is carried out using a color conversion table (LUT). However, the color conversion process may be carried out according to any of various processing schemes including a conversion matrix, a conversion formula, and a learning model such as a neural network or the like.

The print colors predicted by the print density predictor 52 are not limited to a particular print density, but may be any of various colorimetric values. Such colorimetric values may be represented not only by tristimulus values X, Y, Z or values L*, a*, b* in a uniform color space, but also by a distribution of optical properties in a range of wavelengths, e.g., a spectral radiation distribution (spectral distribution), a spectral sensitivity distribution, a spectral reflectance, or a spectral transmittance.

According to the first and second embodiments, four color plates in colors of C, M, Y, K have primarily been described. However, the principles of the present invention may also be applied to any desired types of color plates and any desired number of color plates. For example, standard inks in colors of C, M, Y, K may be combined with optional inks in pale colors such as LC, LM, or the like, and W (white).

The image forming apparatus 14 of the present invention is not limited to an inkjet printer, but may be any printer capable of producing dots by applying color materials to a print medium.

The invention claimed is:

1. A color conversion apparatus for converting colors of a print that is produced using a plurality of color materials, comprising:
    a color signal input unit for inputting device color signals associated with respective amounts of used color materials;
    an adjustment area extractor for extracting at least one of granularity level adjustment areas, in which a granularity level of an image is adjusted, from an image area represented by the device color signals input from the color signal input unit;
    a target value setter for setting a target value for the granularity level in the one of the granularity level adjustment areas that is extracted by the adjustment area extractor;
    a granularity level calculator for calculating the granularity level in the extracted one of the granularity level adjustment areas; and
    an isochromatic converter for converting the device color signals in the extracted one of the granularity level adjustment areas into new device color signals, such that the granularity level calculated by the granularity level calculator is closer to the target value set by the target value setter than before the device color signals are converted, and such that the new device color signals fall within an isochromatic range in a device-independent color space.

2. A color conversion apparatus according to claim 1, wherein if the granularity level is to be reduced in a case where the device color signals are converted, the isochromatic converter converts the device color signals in order to make a total amount of color materials used in the granularity level adjustment area greater than before the device color signals are converted.

3. The color conversion apparatus according to claim 2, wherein the color materials include an achromatic color material and a plurality of chromatic color materials, and if the chromatic color materials are capable of being combined to reproduce a color on the print that can be produced by the achromatic color material, the isochromatic converter converts the device color signals such that an amount of used achromatic color material in the granularity level adjustment area is reduced from an amount before the device color signals are converted, and a total amount of used chromatic color materials in the granularity level adjustment area is increased from a total amount before the device color signals are converted.

4. The color conversion apparatus according to claim 1, wherein if the granularity level is to be increased in a case where the device color signals are converted, the isochromatic converter converts the device color signals in order to make a total amount of color materials used in the granularity level adjustment area smaller than before the device color signals are converted.

5. The color conversion apparatus according to claim 4, wherein the color materials include an achromatic color material and a plurality of chromatic color materials, and if the chromatic color materials are capable of being combined to reproduce a color on the print that can be produced by the achromatic color material, the isochromatic converter converts the device color signals such that an amount of used achromatic color material in the granularity level adjustment area is increased from an amount before the device color signals are converted, and a total amount of used chromatic color materials in the granularity level adjustment area is reduced from a total amount before the device color signals are converted.

6. The color conversion apparatus according to claim 1, wherein the adjustment area extractor extracts a facial area as the granularity level adjustment area.

7. The color conversion apparatus according to claim 1, wherein the adjustment area extractor extracts, as the granularity level adjustment area, an achromatic flat area, a saturation of which is smaller than a first threshold value and a spatial frequency of which is lower than a second threshold value.

8. A color conversion method of converting colors of a print that is produced using a plurality of color materials, said color conversion method when executed causes a processor to perform the steps of:
    inputting device color signals associated with respective amounts of used color materials;
    extracting, using said processor, at least one of granularity level adjustment areas, in which a granularity level of an image is adjusted, from an image area represented by the device color signals that are input;
    setting a target value for the granularity level in the extracted one of the granularity level adjustment areas;
    calculating the granularity level in the extracted one of the granularity level adjustment areas; and
    converting, using said processor, the device color signals in the extracted one of the granularity level adjustment areas into new device color signals, such that the granularity level which is calculated is closer to the set target value than before the device color signals are converted, and such that the new device color signals fall within an isochromatic range in a device-independent color space.

9. A non-transitory recording medium storing a program for converting colors of a print that is produced using a plurality of color materials, the program enabling a computer to function as:
    a color signal input unit for inputting device color signals associated with respective amounts of used color materials;
    an adjustment area extractor for extracting at least one of granularity level adjustment areas, in which a granularity level of an image is adjusted, from an image area represented by the device color signals input from the color signal input unit;
    a target value setter for setting a target value for the granularity level in the one of the granularity level adjustment areas that is extracted by the adjustment area extractor;
    a granularity level calculator for calculating the granularity level in the extracted one of the granularity level adjustment areas; and
    an isochromatic converter for converting the device color signals in the extracted one of the granularity level adjustment areas into new device color signals, such that the granularity level calculated by the granularity level calculator is closer to the target value set by the target value setter than before the device color signals are converted, and such that the new device color signals fall within an isochromatic range in a device-independent color space.

10. A color separation apparatus comprising:
    an adjustment area extractor for extracting at least one of granularity level adjustment areas, in which a granularity level of an image is adjusted, from an image area represented by device color signals that are input;
    a target value setter for setting a target value for the granularity level in the one of the granularity level adjustment areas that is extracted by the adjustment area extractor;
    a granularity level calculator for calculating the granularity level in the extracted one of the granularity level adjustment areas; and
    a color separation condition determiner for determining an item of color separation condition information from among a plurality of items of color separation condition information, for thereby separating the device color signals that are input into device color signals associated with respective amounts of used color materials,
    wherein the color separation condition determiner determines the item of color separation condition information such that the granularity level calculated by the granularity level calculator is closer to the target value set by the target value setter than other color separation conditions.

* * * * *